(12) United States Patent
Zhang (10) Patent No.: US 12,506,554 B2
(45) Date of Patent: Dec. 23, 2025

(54) TIME SYNCHRONIZATION METHOD, DEVICE AND APPARATUS, AND STORAGE MEDIUM

(71) Applicant: SANECHIPS TECHNOLOGY CO., LTD., Shenzhen (CN)

(72) Inventor: Ziyuan Zhang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 462 days.

(21) Appl. No.: 18/170,593

(22) Filed: Feb. 17, 2023

(65) Prior Publication Data

US 2023/0198648 A1 Jun. 22, 2023

Related U.S. Application Data

(63) Continuation of application No. PCT/CN2021/115099, filed on Aug. 27, 2021.

(30) Foreign Application Priority Data

Aug. 31, 2020 (CN) .......................... 202010899715.0

(51) Int. Cl.
*H04J 3/06* (2006.01)

(52) U.S. Cl.
CPC .......... *H04J 3/0647* (2013.01); *H04J 3/0605* (2013.01)

(58) Field of Classification Search
CPC ... H04W 56/001; H04W 48/16; H04W 48/08; H04W 56/0015; H04W 56/004;
(Continued)

(56) References Cited

U.S. PATENT DOCUMENTS 9,226,252 B2 * 12/2015 Akhlaq ............... H04W 56/001
10,340,980 B1 * 7/2019 Wolter ..................... H04B 3/54
(Continued)

FOREIGN PATENT DOCUMENTS

| CN | 101459502 A | 6/2009 |
|----|-------------|--------|
| CN | 103312429 A | 9/2013 |

(Continued)

OTHER PUBLICATIONS

International Search Report and Written Opinion issued in corresponding International Patent Application No. PCT/CN2021/115099; mailed Nov. 25, 2021; 11 pgs.

(Continued)

*Primary Examiner* — Jung Liu
(74) *Attorney, Agent, or Firm* — Vivacqua Crane, PLLC (57) ABSTRACT

Disclosed are a time synchronization method, a time synchronization device, a time synchronization apparatus and a storage medium. The method includes: periodically generating, by a local device, a synchronization request signal, and determining a first reference ID of the local device; sending the synchronization request signal and the first reference ID to peer devices; receiving a second reference ID and time information sent from each peer device through a communication link; and updating time of the local device according to the time information transmitted from a calibration link, the calibration link being a corresponding communication link of a target reference ID in second reference IDs sent from the peer devices.

19 Claims, 3 Drawing Sheets

(58) Field of Classification Search
CPC ...... Y02D 30/70; H04J 3/0697; H04J 3/0667; H04J 3/0664; H04L 2012/5668
See application file for complete search history.

(56) References Cited

U.S. PATENT DOCUMENTS

| | | | |
|---|---|---|---|
| 10,554,319 B2* | 2/2020 | Nishimura | H04W 56/004 |
| 10,901,372 B2* | 1/2021 | Ogawa | G04R 20/02 |
| 10,972,994 B2* | 4/2021 | Abedini | H04W 56/0015 |
| 11,803,516 B2* | 10/2023 | Jewell | G06F 16/172 |
| 12,184,406 B2* | 12/2024 | Li | H04W 56/001 |
| 12,360,952 B2* | 7/2025 | Jewell | G06F 16/1734 |
| 2007/0050523 A1* | 3/2007 | Emeott | H04W 56/001 |
| | | | 709/248 |
| 2009/0086764 A1* | 4/2009 | Lee | H04L 69/28 |
| | | | 370/503 |
| 2013/0010814 A1* | 1/2013 | Miyabe | H04J 3/0652 |
| | | | 370/503 |
| 2014/0029603 A1* | 1/2014 | Nomura | H04W 56/002 |
| | | | 370/350 |
| 2014/0355628 A1* | 12/2014 | Akhlaq | H04W 56/001 |
| | | | 370/509 |
| 2018/0270005 A1* | 9/2018 | Nishimura | H04J 3/0697 |
| 2025/0038870 A1* | 1/2025 | Sakagami | H04J 3/0644 |

FOREIGN PATENT DOCUMENTS

| | | |
|---|---|---|
| CN | 110099439 A | 8/2019 |
| CN | 111092688 A | 5/2020 |
| CN | 111585679 A | 8/2020 |
| WO | 2019217047 A1 | 11/2019 |
| WO | 2020027850 A1 | 2/2020 |

OTHER PUBLICATIONS

Extended Search Report in Corresponding European Application No. 21860529.3, dated Aug. 9, 2024; 10 pgs.
Grant Notice in Corresponding Chinese Application No. 202010899715.0, dated Jun. 5, 2024; 3 pgs.
First Office Action in Corresponding Chinese Application No. 202010899715.0, dated Jan. 27, 2024; 11 pgs.

* cited by examiner

TIME SYNCHRONIZATION METHOD, DEVICE AND APPARATUS, AND STORAGE MEDIUM

CROSS-REFERENCE TO RELATED APPLICATIONS

This application is a continuation application of International Application No. PCT/CN2021/115099, filed on Aug. 27, 2021, which claims priority to Chinese Patent Application No. 202010899715.0, filed on Aug. 31, 2020. The disclosures of the above-mentioned applications are incorporated herein by reference in their entireties.

TECHNICAL FIELD

The embodiments of the present disclosure relates to the technical field of data communication, in particular to a time synchronization method, a time synchronization device, a time synchronization apparatus and a storage medium.

BACKGROUND

As the Internet continuously develops, the data exchange capacity is growing, and the size of the device for accessing the exchange network is increasing. The synchronization among the devices becomes more important, and a new requirement on how to improve the synchronization among the devices is imposed on the exchange network.

SUMMARY

Embodiments of the present disclosure provide a time synchronization method, including: periodically generating, by a local device, a synchronization request signal, and determining a first reference ID of the local device; sending the synchronization request signal and the first reference ID to peer devices; receiving a second reference ID and time information sent from each peer device through a communication link; and updating time of the local device according to the time information transmitted from a calibration link, the calibration link being a corresponding communication link of a target reference ID in second reference IDs sent from the peer devices.

Embodiments of the present disclosure provide a time synchronization device, including: a synchronization request signal generation module for a local device to periodically generate a synchronization request signal and determine a first reference ID of the local device; a synchronization request signal sending module configured to send the synchronization request signal and the first reference ID to peer devices; a time information receiving module configured to receive a second reference ID and time information sent from each peer device through communication link; and a time update module configured to update time of the local device according to time information transmitted from a calibration link, the calibration link being a corresponding communication link of a target reference ID in second reference IDs sent from the peer devices.

Embodiments of the present disclosure provide a computer device, including a memory, a processor, and a computer program stored in the memory and executable by the processor. When the computer program is executed by the processor, the time synchronization method according to the embodiments of the present disclosure is implemented.

Embodiments of the present disclosure provide a computer-readable storage medium. A computer program is stored in the computer-readable storage medium, and when the computer program is executed by a processor, the time synchronization method according to the embodiments of the present disclosure is implemented.

DETAILED DESCRIPTION OF THE EMBODIMENTS

In order to make the objectives, technical solutions, and advantages of the present disclosure clearer, the embodiments of the present disclosure will be described in detail below with reference to the accompanying drawings. It should be noted that, in the case of no conflict, the embodiments and the features of the embodiments of the present disclosure can be combined with each other arbitrarily.

It should be understood that the embodiments described herein are only used to explain the present disclosure, and are not intended to limit the present disclosure.

In the following description, the use of a suffix such as "module," "component" or "unit" to represent an element is merely for the illustration of the present disclosure, and has no specific meaning in its own sense. Thus, a mix of the "module," "component" and "unit" may be employed.

As the Internet continuously develops, the data exchange capacity is growing, and the size of the device for accessing the exchange network is increasing. The synchronization among the devices becomes more important, and a new requirement on how to improve the synchronization among the devices is imposed on the exchange network. Meanwhile, with the expansion of the network, the communication states among the devices become more complex, and a representative communication state include a full-communication state and a semi-communication state. In the full-communication state, all the devices are communicated with each other, and in the semi-communication state, parts of the devices are not communicated with each other. Therefore, the realization of synchronization among the devices becomes increasingly important.

Embodiments of the present disclosure disclose a time synchronization method, a time synchronization device, a time synchronization apparatus and a storage medium, which can implement time synchronization between devices in a local area network, and improve the flexibility and robustness of device during use.

Figure 1:
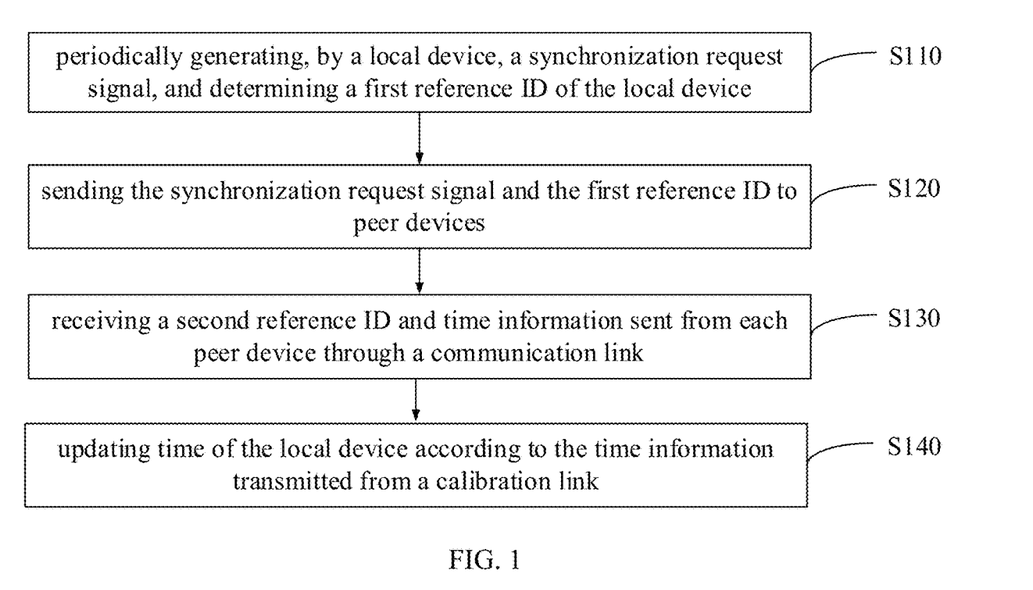
FIG. 1 is a flowchart of a time synchronization method according to an embodiment of the present disclosure.

In an embodiment, FIG. 1 is a flowchart of a time synchronization method according to an embodiment of the present disclosure. The method may be applicable to the case where the time between multiple devices is synchronized. The method may be performed by a time synchronization device. As shown in FIG. 1, the method includes blocks S110 to S140.

Figure 2:
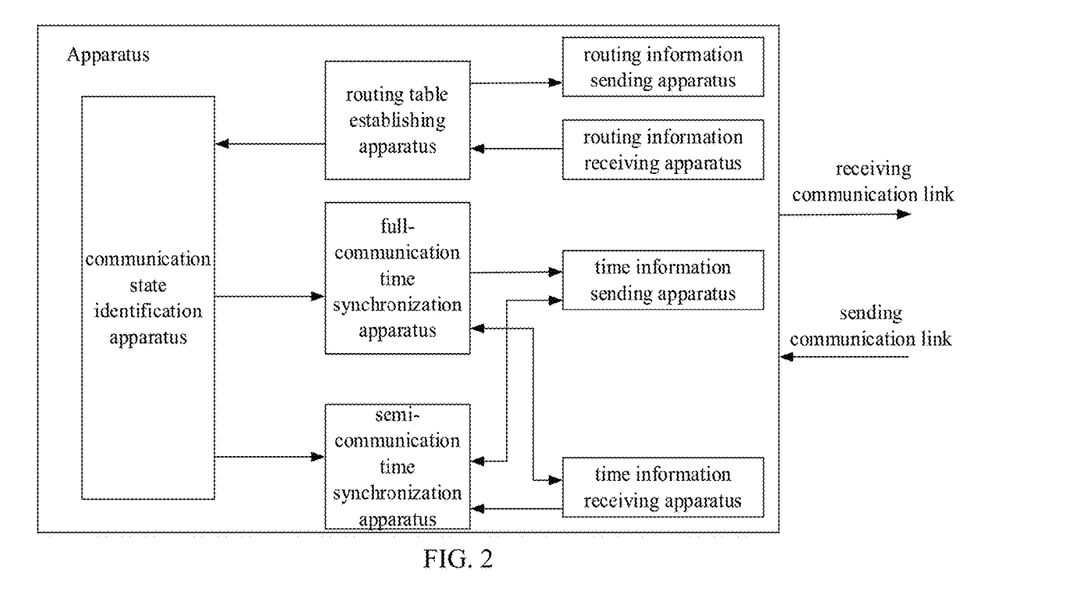
FIG. 2 is a schematic structural diagram of a time synchronization apparatus according to an embodiment of the present disclosure.

FIG. 2 is a schematic structural diagram of a time synchronization apparatus according to an embodiment of the present disclosure. As shown in FIG. 2, the apparatus includes a routing information sending apparatus, a routing information receiving apparatus, a routing table establishing apparatus, a time information sending apparatus, a time information receiving apparatus, a communication state identification apparatus, a full-communication time synchronization apparatus, and a semi-communication time synchronization apparatus.

The routing information sending apparatus may generate and send a local device ID and a link reachability state of the local device to inform a peer device a state of the local device. The routing information receiving apparatus may receive routing information of the peer device, and extract a peer device ID and a link reachability state of the peer device. The routing table establishing apparatus may determine a communication state between each peer device and the local device according to the received routing information, and establish a routing table. The communication state identification apparatus may identify the communication state between each peer device and the local device in a local area network according to information from the routing table. The time information sending apparatus may send time information. The time information receiving apparatus may receive and process time information from the peer device. The full-communication time synchronization apparatus is configured for realizing time synchronization in the full-communication state, and the semi-communication time synchronization apparatus is configured for realizing time synchronization in the semi-communication state.

In block S110, a synchronization request signal is periodically generated by a local device, and a first reference ID of the local device is determined.

A reference ID may be a device ID which serves as a reference in the local area network, and the local area network may be a mesh network.

In an embodiment, the process of periodically generating the synchronization request signal may include counting an operating time of the local device cyclically, and generating the synchronization request signal in response that a count value of each cycle reaches a preset value.

The local device may carry out the counting cyclically through a cycle counter. For example, the cyclic counter periodically generates 12 numbers of 0 to 11 in sequence. When the count value 0 is generated, a synchronization request signal is generated. In this embodiment, the count value generated by the cycle counter is taken as time information of the local device, for example, if the value currently generated by the cyclic counter is 5, the time of the local device is 5. In the present scenario, all devices in the local area network employ cycle counters for timing.

In an embodiment, the first reference ID of the local device may be determined according to the communication state between each peer device and the local device in the local area network.

In an embodiment, the local device ID is determined as the first reference ID in response that each peer device is in communication with the local device, or whether the local device is a master device is determined in response that part of the peer devices are in communication with the local device, and the local device ID is determined as the first reference ID in response that the local device is the master device, or the peer device ID with minimum or maximum number in the local area network is determined as the first reference ID in response that the local device is not the master device.

In the full-communication state, all devices are communicated with each other, and in the semi-communication state, parts of the devices are communicated with each other. The minimum or maximum device ID may be understood as a device ID with the minimum or maximum ID number in the local area network. The minimum device ID is taken as an example, if five devices, respectively with IDs 01, 02, 03, 04 and 05, are included in the local area network, ID 01 is the minimum device ID.

In an embodiment, the process of determining the communication state between each peer device and the local device in the local area network may include: receiving first routing sent from each peer device, generating a first routing table according to the first routing information, and determining the communication state between each peer device and the local device in the local area network according to the first routing table.

The first routing information includes a peer device ID, a link reachability state, and link information of each peer device. The link reachability state includes a reachability state and an unreachability state, 1 indicates the reachability state, and 0 indicates the unreachability state. The link information may be a link number. The routing table is configured to represent the communication state between the local device and each peer device, and may be a table of the number of device IDs multiplied by the number of links, and values in the table can represent the communication state between the local device and each peer device.

The process of generating the first routing table according to the first routing information may include extracting the peer device ID, the link reachability state and the link numbers of each peer device, and establishing the communication state between the local device and each peer device according to the value corresponding to the link reachability state.

The process of determining the communication state between each peer device and the local device according to the first routing table may include: determining a number of reachability states of the peer devices; and determining that each peer device is in communication with the local device in response that the number of reachability states is equal to a total number of the peer devices in the local area network; or determining that part of the peer devices are in communication with the local device in response that the number of reachability states is different from a total number of the peer devices in the local area network.

In this embodiment, the non-zero values (i.e., 1) in the routing table is accumulated. When an accumulated value is equal to the total number of the peer devices in the local area network, each peer device is in communication with the local device in the local area network. When the accumulated value is not equal to the total number of the peer devices in the local area network, part of the peer devices are in communication with the local device in the local area network.

In this embodiment, the local device may send second routing information to each peer device through each communication link in a polling manner, for the peer device to generate a second routing table according to the received second routing information. The second routing information includes a local device ID, a link reachability state, and link information of the local device.

The manner in which each peer device sends the first routing information to the local device is the same as the above, and details are not repeated herein.

In block S120, the synchronization request signal and the first reference ID are sent to peer devices.

In this embodiment, the process of sending, by the local device, data to the peer devices may include: sending the data to the communication link of the local device; transmitting, by the communication link of the local device, the data to communication links of the peer devices, and transmitting, by the communication links of the peer devices, the data to the peer devices.

Similarly, the process of sending, by the local device, the synchronization request signal and the first reference ID to peer devices may include: sending, by the local device, the synchronization request signal and the first reference ID to the communication link of the local device; transmitting, by the communication link of the local device, the synchronization request signal and the first reference ID to communication links of the peer devices; and transmitting, by the communication links of the peer devices, the synchronization request signal and the first reference ID to the peer devices.

In this embodiment, the local device may send the synchronization request signal and the first reference ID to the peer devices which are communicated with the local device.

In block S130, a second reference ID and time information sent from each peer device through a communication link are received.

The time information may be a count value generated by the peer device using a cyclic counter.

After receiving the synchronization request signal sent from the local device, each peer device may obtains the time information and the second reference ID, and send the time information and the second reference ID to the local device.

The process of sending, by each peer device, the time information and the second reference ID to the local device may include: sending, by each peer device, the time information and the second reference ID to the communication link of each peer device; transmitting, by the communication link of each peer device, the time information and the second reference ID to the communication link of the local device, and transmitting, by the communication link of the local device, the time information and the second reference ID to the local device.

In block S140, time of the local device is updated according to time information transmitted from a calibration link.

The calibration link is a communication link corresponding to a target reference ID in second reference IDs sent from the peer devices. The target reference ID may be the minimum or maximum second reference ID in the second reference IDs, and the communication link corresponding to the target reference ID may be understood as a communication link of the local device for transmitting the target reference ID. In this embodiment, the local device may receive the second reference IDs sent from a plurality of peer device, compares the second reference IDs, and determines the communication link corresponding to the minimum or maximum reference ID as the calibration link.

In an embodiment, in response that only one calibration link exists, the time of the local device is updated according to the time information transmitted from the calibration link.

In an embodiment, in response that multiple calibration links exist, a calibration link with the maximum or minimum link number among the multiple calibration links is determined as a target link, and the time of the local device is updated according to the time information transmitted from the target link.

The way of updating the time of the local device may be to update the current count value of the local device, that is, the current count value of the local device is updated to the transmitted count value.

Embodiments of the present disclosure provide a time synchronization method, including: periodically generating, by a local device, a synchronization request signal, and determining a first reference ID of the local device; sending the synchronization request signal and the first reference ID to peer devices; receiving a second reference ID and time information sent from each peer device through a communication link; and updating time of the local device according to the time information transmitted from a calibration link, the calibration link being a corresponding communication link of a target reference ID in second reference IDs sent from the peer devices. According to the time synchronization method provided by the embodiments of the present disclosure, the calibration link is determined according to the received second reference IDs, and the time of the local device is updated according to the time information transmitted from the calibration link, to synchronize the time among the devices in the local area network, and improve the flexibility and robustness of the devices during use.

Figure 3:
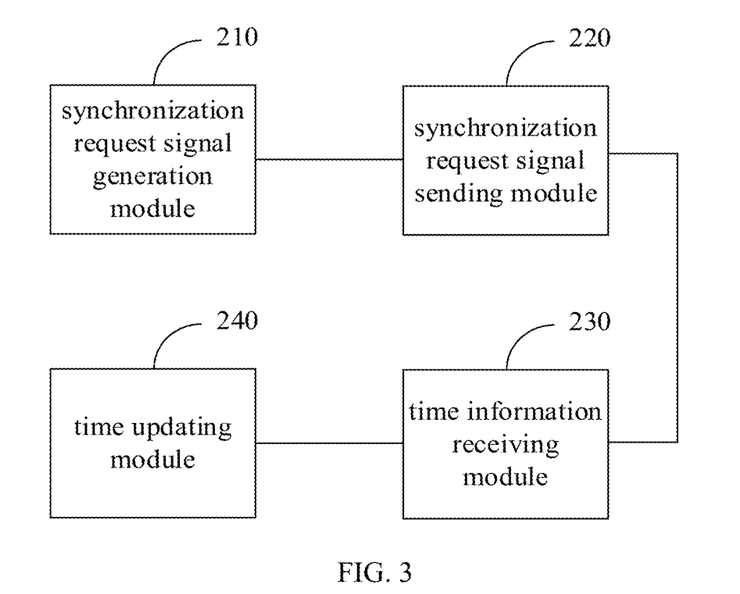
FIG. 3 is a schematic structural diagram of a time synchronization device according to an embodiment of the present disclosure.

In an embodiment, FIG. 3 is a schematic structural diagram of a time synchronization device according to an embodiment of the present disclosure. As shown in FIG. 3, the device includes a synchronization request signal generation module 210, a synchronization request signal sending module 220, a time information receiving module 230, and a time updating module 240.

The synchronization request signal generation module 210 is configured for a local device to periodically generate a synchronization request signal and determine a first reference ID of the local device.

The synchronization request signal sending module 220 is configured to send the synchronization request signal and the first reference ID to peer devices.

The time information receiving module 230 is configured to receive a second reference ID and time information sent from each peer device through a communication link.

The time updating module 240 is configured to update time of the local device according to time information transmitted from a calibration link, and the calibration link is a corresponding communication link of a target reference ID in second reference IDs sent from the peer devices.

In an embodiment, the synchronization request signal generation module 210 is further configured to count an operating time of the local device cyclically, and generate the synchronization request signal in response that a count value of each cycle reaches a preset value.

In an embodiment, the local device and the peer devices are in the same local area network, and the device further includes a communication state determination module. The communication state determining module is configured to receive first routing information sent from each peer device, generate a first routing table according to the first routing information, and determine the communication state between each peer device and the local device in the local area network according to the first routing table. The first routing information includes a peer device ID, a link reachability state, and link information of each peer device. The first routing table is configured to determine the communication state between the local device and each peer device in the local area network.

In an embodiment, the link reachability state include a reachability state and an unreachability state, and the communication state determination module is further configured to determine a number of reachability states of the peer devices, and determine that each peer device is in communication with the local device in response that the number of reachability states is equal to a total number of the peer devices in the local area network, or determine that part of the peer devices are in communication with the local device in response that the number of reachability states is different from a total number of the peer devices in the local area network.

In an embodiment, the time synchronization device further includes a second routing information sending module configured to send second routing information to each peer device through each communication link in a polling manner, for each peer device to generate a second routing table according to the received second routing information. The second routing information includes a local device ID, a link reachability state, and link information of the local device.

In an embodiment, the determining the first reference ID of the local area network includes: in response that each peer device is in communication with the local device, determining the local device ID as the first reference ID; or in response that part of the peer devices are in communication with the local device, determining whether the local device is a master device; and in response that the local device is the master device, determining the local device ID as the first reference ID; or in response that the local device is not the master device, determining the peer device ID with minimum or maximum number in the local area network as the first reference ID.

In an embodiment, the time updating module 240 is further configured to determine a calibration link with the maximum or minimum link number among multiple calibration links as a target link in response that multiple calibration links exist, and update the time of the local device according to the time information transmitted from the target link.

Figure 4:
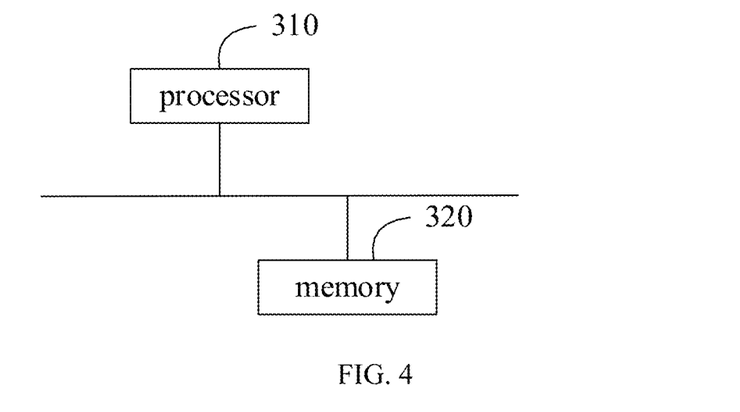
FIG. 4 is a schematic structural diagram of a computer device according to an embodiment of the present disclosure.

FIG. 4 is a schematic structural diagram of a computer device according to an embodiment of the present disclosure. As shown in FIG. 4, the computer device includes a processor 310 and a memory 320. The computer device may include one processor 310 or multiple processors 310, and the computer device including one processor 310 is taken as an example in FIG. 4. The computer device may include one memory 320 or multiple memories 320, and the computer device including one memory 320 is taken as an example in FIG. 4. The processor 310 may be connected with and the memory 320 through a bus or other means, and the processor 310 being connected with the memory 320 through a bus is taken as an example in FIG. 4.

As a computer-readable storage medium, the memory 320 can be configured to store a software program, a computer-executable program and a computer-executable module, such as the program instructions/modules corresponding to the device in any embodiment of the present disclosure (such as an encoding module and a first sending module in a data transmission device). The memory 320 may include a program storage area and a data storage area, the program storage area may store an operating system and an application program required by at least one function, and the data storage area may store data created according to the use of the device. In addition, the memory 320 may include a high-speed random access memory, and a non-volatile memory, such as at least one magnetic disk storage device, a flash memory device, or other non-volatile solid-state memory devices. In some examples, the memory 320 may further include memories remotely disposed relative to the processor 310, which may be connected to the device over a network. Examples of the network include, but are not limited to, the Internet, an intranet, a local area network, a mobile communication network, and combinations thereof.

The device provided above may be configured to perform the time synchronization method according to any embodiment described above, and have corresponding functions and effects.

The program stored in the memory 320 may be program instructions/modules corresponding to the time synchronization method provided in the embodiments of the present disclosure, and the processor 310 executes one or more functional applications and data processing of the computer device by running the software programs, instructions, and modules stored in the memory 320, namely, implements the time synchronization method in the foregoing method embodiments. It can be understood that, when the device is a receiving terminal, the device can perform the time synchronization method provided in any embodiment of the present disclosure, and have corresponding functions and effects.

Embodiment of the present disclosure further provide a storage medium including computer-executable instructions. The computer-executable instructions, when executed by a computer processor, are configured to perform a time synchronization method, and the method including: periodically generating, by a local device, a synchronization request signal, and determining a first reference ID of the local device; sending the synchronization request signal and the first reference ID to peer devices; receiving a second reference ID and time information sent from each peer device through a communication link; and updating time of the local device according to the time information transmitted from a calibration link, the calibration link being a corresponding communication link of a target reference ID in second reference IDs sent from the peer devices.

Those skilled in the art will appreciate that the term user device encompasses any suitable type of wireless user device, such as a mobile phone, a portable data processing device, a portable web browser, or a vehicle-mounted mobile station.

In general, various embodiments of the present disclosure may be implemented by hardware or a special purpose circuit, software, logic, or any combination thereof. For example, some portions may be implemented by hardware, while other portions may be implemented by firmware or software that may be executed by a controller, a microprocessor, or another computing device, which is not limited in the present disclosure.

Embodiments of the present disclosure may be implemented by executing computer program instructions by a data processor of a mobile device, for example, in a processor, by hardware, or by a combination of software and hardware. The computer program instructions may be assembly instructions, Instruction Set Architecture (ISA) instructions, machine instructions, machine-related instructions, microcodes, firmware instructions, state settings data, or source codes or object codes in one programming language or in any combination of multiple programming languages.

The block diagrams of any logic flows in the drawings of the present disclosure may represent program steps, or may represent logic circuits, modules, and functions connected to each other, or may represent a combination of program steps and logic circuits, modules, and functions. The computer program may be stored in a memory. The memory may be any type suitable for the local technical environment and may be implemented using any suitable data storage technology, such as, but not limited to, Read-Only Memory (ROM), Random Access Memory (RAM), optical memory devices and systems (Digital Video Disc (DVD) or Compact Disk (CD)), etc. The computer-readable medium may include a non-transitory storage medium. The data processor may be any type suitable for the local technical environment, such as, but not limited to, a general purpose computer, a special purpose computer, a microprocessor, a Digital Signal processor (DSP), an Application Specific Integrated Circuit (ASIC), a Programmable logic device (FGPA), and a processor based on a multi-core processor architecture.

The above are merely exemplary embodiments of the present disclosure and are not intended to limit the claimed scope of the present disclosure.

The foregoing has provided a detailed description of exemplary embodiments of the present disclosure by way of exemplary and non-limiting examples. Many modifications and adaptations of the above embodiments will be apparent to those skilled in the art combining the drawings and claims, and do not depart from the scope of the present disclosure. Therefore, the proper scope of the present disclosure will be determined according to the claims.

What is claimed is:

1. A time synchronization method, comprising:
receiving first routing information sent from each peer device;
generating a first routing table according to the first routing information, the first routing table being configured to determine a communication state between each peer device and the local device in the local area network;
determining the communication state between each peer device and the local device in the local area network according to the first routing table;
periodically generating, by the local device, a synchronization request signal, and determining a first reference ID of the local device;
sending the synchronization request signal and the first reference ID to the peer devices;
receiving a second reference ID and time information sent from each peer device through a communication link; and
updating time of the local device according to the time information transmitted from a calibration link, the calibration link being a corresponding communication link of a target reference ID in second reference IDs sent from the peer devices;
wherein the local device and the peer devices are in a same local area network, and the first routing information comprising a peer device ID, a link reachability state and link information of each peer device.

2. The method of claim 1, wherein the periodically generating the synchronization request signal comprises:
counting an operating time of the local device cyclically; and
generating the synchronization request signal in response that a count value of each cycle reaches a preset value.

3. The method of claim 1, wherein the link reachability state comprises a reachability state and an unreachability state, and the determining the communication state between each peer device and the local device in the local area network according to the first routing table comprises:
determining a number of reachability states of the peer devices; and
determining that each peer device is in communication with the local device in response that the number of reachability states is equal to a total number of the peer devices in the local area network; or
determining that part of the peer devices are in communication with the local device in response that the number of reachability states is different from a total number of the peer devices in the local area network.

4. The method of claim 1, further comprising:
sending second routing information to each peer device through each communication link in a polling manner, the second routing information comprising a local device ID, a link reachability state and link information of the local device; and
generating a second routing table according to the second routing information.

5. The method of claim 3, wherein the determining the first reference ID of the local device comprises:
in response that each peer device is in communication with the local device, determining the local device ID as the first reference ID; or
in response that part of the peer devices are in communication with the local device, determining whether the local device is a master device; and
in response that the local device is the master device, determining the local device ID as the first reference ID; or
in response that the local device is not the master device, determining the peer device ID with minimum or maximum number in the local area network as the first reference ID.

6. The method of claim 1, wherein the updating the time of the local device according to the time information transmitted from the calibration link comprises:
in response that multiple calibration links exist, determining a calibration link with a maximum or minimum link number among the multiple calibration links as a target link; and
updating the time of the local device according to the time information transmitted from the target link.

7. The method of claim 1, wherein the updating the time of the local device according to the time information transmitted from the calibration link comprises:
in response that only one calibration link exist, updating the time of the local device according to the time information transmitted from the only one calibration link.

8. The method of claim 1, wherein the sending, by the local device, the synchronization request signal and the first reference ID to peer devices comprises:
sending, by the local device, the synchronization request signal and the first reference ID to the communication link of the local device;
transmitting, by the communication link of the local device, the synchronization request signal and the first reference ID to communication links of the peer devices; and
transmitting, by the communication links of the peer devices, the synchronization request signal and the first reference ID to the peer devices.

9. The method of claim 1, wherein the target reference ID is a second reference ID with the minimum or maximum number among the second reference IDs.

10. A computer device, comprising a memory, a processor, and a computer program stored in the memory and executable by the processor, wherein when the computer program is executed by the processor, to implement a time synchronization method comprising:
receiving first routing information sent from each peer device;
generating a first routing table according to the first routing information, the first routing table being configured to determine a communication state between each peer device and the local device in the local area network;

determining the communication state between each peer device and the local device in the local area network according to the first routing table;

periodically generating, by the local device, a synchronization request signal, and determining a first reference ID of the local device;

sending the synchronization request signal and the first reference ID to the peer devices;

receiving a second reference ID and time information sent from each peer device through a communication link; and updating time of the local device according to the time information transmitted from a calibration link, the calibration link being a corresponding communication link of a target reference ID in second reference IDs sent from the peer devices;

wherein the local device and the peer devices are in a same local area network, and the first routing information comprising a peer device ID, a link reachability state and link information of each peer device.

11. A non-transitory computer-readable storage medium, wherein a computer program is stored in the computer-readable storage medium, and when the computer program is executed by a processor, to implement a time synchronization method comprising:

receiving first routing information sent from each peer device;

generating a first routing table according to the first routing information, the first routing table being configured to determine a communication state between each peer device and the local device in the local area network;

determining the communication state between each peer device and the local device in the local area network according to the first routing table;

periodically generating, by the local device, a synchronization request signal, and determining a first reference ID of the local device;

sending the synchronization request signal and the first reference ID to the peer devices;

receiving a second reference ID and time information sent from each peer device through a communication link; and updating time of the local device according to the time information transmitted from a calibration link, the calibration link being a corresponding communication link of a target reference ID in second reference IDs sent from the peer devices;

wherein the local device and the peer devices are in a same local area network, and the first routing information comprising a peer device ID, a link reachability state and link information of each peer device.

12. The computer device of claim 10, wherein the periodically generating the synchronization request signal comprises:

counting an operating time of the local device cyclically; and generating the synchronization request signal in response that a count value of each cycle reaches a preset value.

13. The computer device of claim 10, wherein the link reachability state comprises a reachability state and an unreachability state, and the determining the communication state between each peer device and the local device in the local area network according to the first routing table comprises:

determining a number of reachability states of the peer devices; and determining that each peer device is in communication with the local device in response that the number of reachability states is equal to a total number of the peer devices in the local area network; or determining that part of the peer devices are in communication with the local device in response that the number of reachability states is different from a total number of the peer devices in the local area network.

14. The computer device of claim 10, wherein the time synchronization method further comprises:

sending second routing information to each peer device through each communication link in a polling manner, the second routing information comprising a local device ID, a link reachability state and link information of the local device; and generating a second routing table according to the second routing information.

15. The computer device of claim 13, wherein the determining the first reference ID of the local device comprises:

in response that each peer device is in communication with the local device, determining the local device ID as the first reference ID; or in response that part of the peer devices are in communication with the local device, determining whether the local device is a master device; and in response that the local device is the master device, determining the local device ID as the first reference ID; or in response that the local device is not the master device, determining the peer device ID with minimum or maximum number in the local area network as the first reference ID.

16. The non-transitory computer-readable storage medium of claim 11, wherein the periodically generating the synchronization request signal comprises:

counting an operating time of the local device cyclically; and generating the synchronization request signal in response that a count value of each cycle reaches a preset value.

17. The non-transitory computer-readable storage medium of claim 11, wherein the link reachability state comprises a reachability state and an unreachability state, and the determining the communication state between each peer device and the local device in the local area network according to the first routing table comprises:

determining a number of reachability states of the peer devices; and determining that each peer device is in communication with the local device in response that the number of reachability states is equal to a total number of the peer devices in the local area network; or determining that part of the peer devices are in communication with the local device in response that the number of reachability states is different from a total number of the peer devices in the local area network.

18. The non-transitory computer-readable storage medium of claim 11, wherein the time synchronization method further comprises:

sending second routing information to each peer device through each communication link in a polling manner, the second routing information comprising a local device ID, a link reachability state and link information of the local device; and generating a second routing table according to the second routing information.

19. The non-transitory computer-readable storage medium of claim 18, wherein the determining the first reference ID of the local device comprises:

in response that each peer device is in communication with the local device, determining the local device ID as the first reference ID; or in response that part of the peer devices are in communication with the local device, determining whether the local device is a master device; and in response that the local device is the master device, determining the local device ID as the first reference ID; or in response that the local device is not the master device, determining the peer device ID with minimum or maximum number in the local area network as the first reference ID.

* * * * *